United States Patent
Wu et al.

(10) Patent No.: US 12,223,323 B2
(45) Date of Patent: Feb. 11, 2025

(54) OUT-OF-ORDER VECTOR IOTA CALCULATIONS

(71) Applicant: SiFive, Inc., San Mateo, CA (US)

(72) Inventors: Yueh Chi Wu, Taichung (TW); Nicolas Rémi Brunie, San Mateo, CA (US)

(73) Assignee: SiFive, Inc., Santa Clara, CA (US)

( * ) Notice: Subject to any disclaimer, the term of this patent is extended or adjusted under 35 U.S.C. 154(b) by 0 days.

(21) Appl. No.: 18/337,652

(22) Filed: Jun. 20, 2023

(65) Prior Publication Data

US 2024/0184584 A1 Jun. 6, 2024

Related U.S. Application Data

(60) Provisional application No. 63/429,928, filed on Dec. 2, 2022.

(51) Int. Cl.
*G06F 9/30* (2018.01)
*G06F 9/38* (2018.01)

(52) U.S. Cl.
CPC ...... *G06F 9/30145* (2013.01); *G06F 9/30036* (2013.01); *G06F 9/3836* (2013.01)

(58) Field of Classification Search
None
See application file for complete search history.

(56) References Cited

U.S. PATENT DOCUMENTS

| | | | |
|---|---|---|---|
| 9,424,042 B2 * | 8/2016 | Sasanka | G06F 9/30076 |
| 2013/0283022 A1 * | 10/2013 | Sasanka | G06F 9/30038 |
| | | | 712/226 |

* cited by examiner

*Primary Examiner* — Michael Sun
(74) *Attorney, Agent, or Firm* — Kilpatrick Townsend & Stockton LLP

(57) ABSTRACT

A method for executing vector iota (viota) operation is disclosed. The method includes fetching a viota instruction, decoding the viota instruction into multiple viota micro-operations (uops), computing a first element viota value of a respective viota uop, determining a respective last element viota value of the respective viota uop based on the first element viota value of the respective uop, and writing the respective last element viota value of the respective viota uop to an allocated physical register. Each viota uop of the multiple viota uops has multiple elements, and each element has a viota value corresponding to a sum of active mask bits of preceding elements of the viota uops. The multiple elements of each viota uop comprise at least a first element that has a starting bit position of a respective uop and a last element that has an ending bit position of the respective uop.

20 Claims, 6 Drawing Sheets

OUT-OF-ORDER VECTOR IOTA CALCULATIONS

CROSS REFERENCE TO RELATED APPLICATION

This application claims priority to and the benefit of U.S. Patent Application Ser. No. 63/429,928, filed on Dec. 2, 2022, the entire disclosure of which is hereby incorporated by reference.

TECHNICAL FIELD

This disclosure relates generally to integrated circuits and, more specifically, implementation of out-of-order vector iota calculations.

BACKGROUND

A central processing unit (CPU) or processor core may be implemented according to a particular microarchitecture. As used herein, a "microarchitecture" refers to the way an instruction set architecture (ISA) (e.g., the RISC-V instruction set) is implemented by a processor core. A microarchitecture may be implemented by various components, such as decode units, rename units, dispatch units, execution units, registers, caches, queues, data paths, and/or other logic associated with instruction flow. A processor core may execute instructions in a pipeline based on the microarchitecture that is implemented.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

The vector iota (viota) instruction reads a source vector mask register and writes to each element of the destination vector register group the sum of all the bits of elements in the mask register whose index is less than the element, e.g., a parallel prefix sum of the mask values. This instruction can be masked, in which case only the enabled elements contribute to the sum. The viota instruction reads the mask source and produces the destination vector, where each element in the destination vector registers is the sum of all the previous mask bits. (See, e.g., "RISC-V "V" Vector Extension"). Further detailed explanations of viota instruction and related information may be obtained by reference to public document "RISC-V "V" Vector Extension", which is incorporated herein in its entirety by reference.

The viota can write to multiple destination vectors specified by a length multiplier (LMUL) configuration or setting, where LMUL is a vector group size. In a basic implementation of viota in an in-order processor, the processor can crack or decode the viota into multiple micro-operations to update multiple destination vector registers. A respective start element viota value of a respective micro-operation depends on (or relies on the resulting value of) the last element in the destination vector register of the previous (e.g., preceding) micro-operation. Accordingly, the viota has a dependency issue. That is, the viota has an ordering dependency between micro-operations, which limits the out-of-order execution and a processor fallbacks to in-order execution. For example, if LMUL=4, the viota (e.g., viota operation) will be cracked into 4 micro-operations with a later micro-operation's result depending on the result of previous micro-operation: viota micro-operation 0 calculates the viota value starting from 0; viota micro-operation 1 calculates the viota value starting from the last value (e.g., last element viota value) of micro-operation 0; viota micro-operation 2 calculates the viota value starting from the last value (e.g., last element viota value) of micro-operation 1; and viota micro-operation 3 calculates the viota value start from the last value (e.g., last element viota value) of micro-operation 2. This impacts performance.

In implementations, the execution speed for viota instructions can be increased by always (or continuously) re-computing a respective first element viota value (i.e., sum of active mask bits of previous mask slices of previous micro-operation(s)) for each respective micro-operation. That is, the viota micro-operations are no longer dependent on a previous result and out-of-order execution can be performed accordingly.

Figure 1:
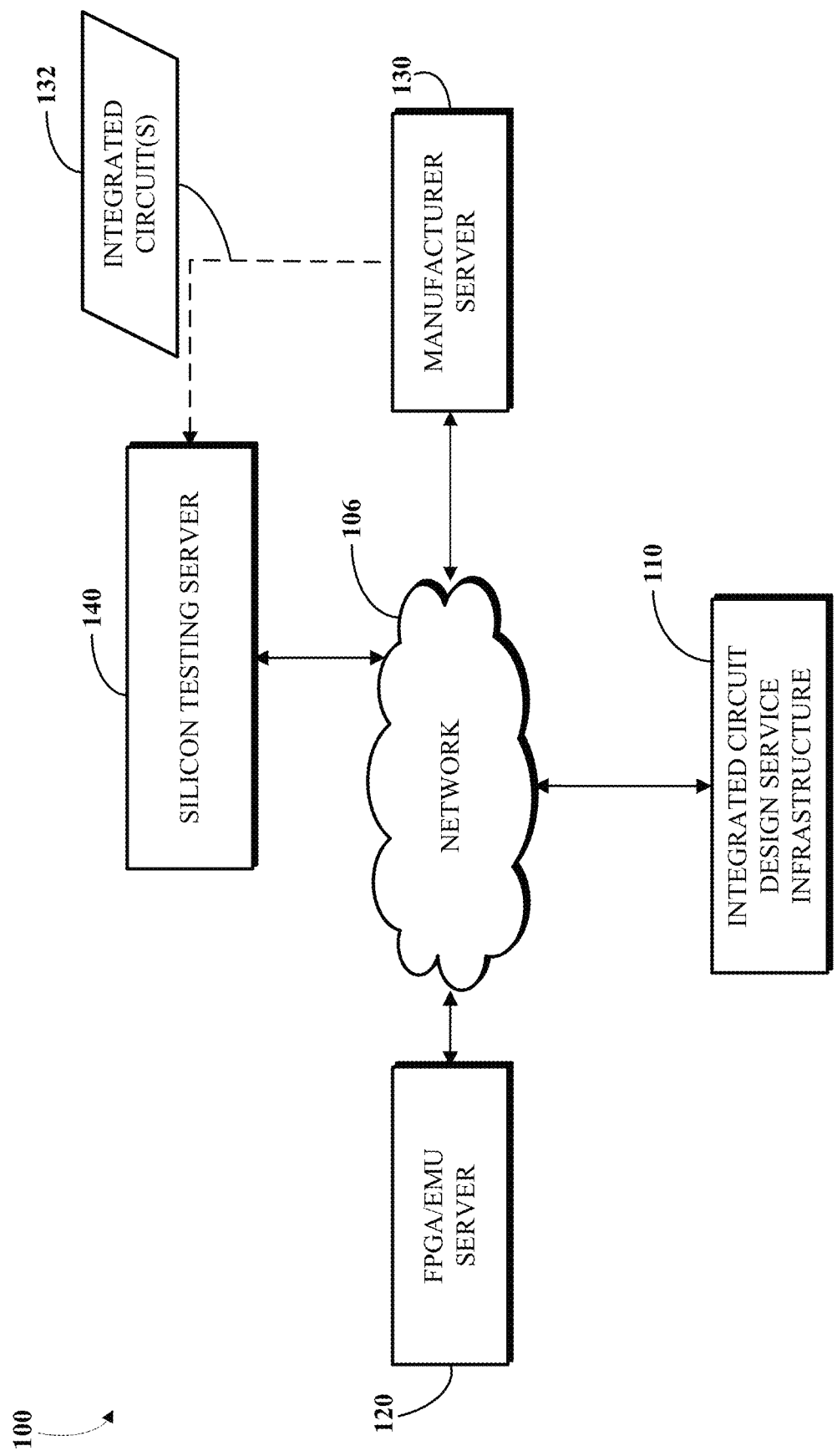
FIG. 1 is a block diagram of an example of a system for facilitating generation and manufacture of integrated circuits.

To describe some implementations in greater detail, reference is first made to examples of hardware and software structures used to implement a system including components that may perform viota micro-operations and/or execute viota instructions. FIG. 1 is a block diagram of an example of a system 100 for generation and manufacture of integrated circuits. The system 100 includes a network 106, an integrated circuit design service infrastructure 110 (e.g., integrated circuit generator), a field programmable gate array (FPGA)/emulator server 120, and a manufacturer server 130. For example, a user may utilize a web client or a scripting application program interface (API) client to command the integrated circuit design service infrastructure 110 to automatically generate an integrated circuit design based on a set of design parameter values selected by the user for one or more template integrated circuit designs. In some implementations, the integrated circuit design service infrastructure 110 may be configured to generate an integrated circuit design like the integrated circuit design shown and described in FIG. 3.

The integrated circuit design service infrastructure 110 may include a register-transfer level (RTL) service module configured to generate an RTL data structure for the integrated circuit based on a design parameters data structure. For example, the RTL service module may be implemented as Scala code. For example, the RTL service module may be implemented using Chisel. For example, the RTL service module may be implemented using flexible intermediate representation for register-transfer level (FIRRTL) and/or a FIRRTL compiler. For example, the RTL service module may be implemented using Diplomacy. For example, the RTL service module may enable a well-designed chip to be automatically developed from a high level set of configuration settings using a mix of Diplomacy, Chisel, and FIRRTL. The RTL service module may take the design parameters data structure (e.g., a java script object notation (JSON) file) as input and output an RTL data structure (e.g., a Verilog file) for the chip.

In some implementations, the integrated circuit design service infrastructure 110 may invoke (e.g., via network communications over the network 106) testing of the resulting design that is performed by the FPGA/emulation server 120 that is running one or more FPGAs or other types of hardware or software emulators. For example, the integrated circuit design service infrastructure 110 may invoke a test using a field programmable gate array, programmed based on a field programmable gate array emulation data structure, to obtain an emulation result. The field programmable gate array may be operating on the FPGA/emulation server 120, which may be a cloud server. Test results may be returned by the FPGA/emulation server 120 to the integrated circuit design service infrastructure 110 and relayed in a useful format to the user (e.g., via a web client or a scripting API client).

The integrated circuit design service infrastructure 110 may also facilitate the manufacture of integrated circuits using the integrated circuit design in a manufacturing facility associated with the manufacturer server 130. In some implementations, a physical design specification (e.g., a graphic data system (GDS) file, such as a GDSII file) based on a physical design data structure for the integrated circuit is transmitted to the manufacturer server 130 to invoke manufacturing of the integrated circuit (e.g., using manufacturing equipment of the associated manufacturer). For example, the manufacturer server 130 may host a foundry tape-out website that is configured to receive physical design specifications (e.g., such as a GDSII file or an open artwork system interchange standard (OASIS) file) to schedule or otherwise facilitate fabrication of integrated circuits. In some implementations, the integrated circuit design service infrastructure 110 supports multi-tenancy to allow multiple integrated circuit designs (e.g., from one or more users) to share fixed costs of manufacturing (e.g., reticle/mask generation, and/or shuttles wafer tests). For example, the integrated circuit design service infrastructure 110 may use a fixed package (e.g., a quasi-standardized packaging) that is defined to reduce fixed costs and facilitate sharing of reticle/ mask, wafer test, and other fixed manufacturing costs. For example, the physical design specification may include one or more physical designs from one or more respective physical design data structures in order to facilitate multi-tenancy manufacturing.

In response to the transmission of the physical design specification, the manufacturer associated with the manufacturer server 130 may fabricate and/or test integrated circuits based on the integrated circuit design. For example, the associated manufacturer (e.g., a foundry) may perform optical proximity correction (OPC) and similar post-tape-out/pre-production processing, fabricate the integrated circuit(s) 132, update the integrated circuit design service infrastructure 110 (e.g., via communications with a controller or a web application server) periodically or asynchronously on the status of the manufacturing process, perform appropriate testing (e.g., wafer testing), and send to a packaging house for packaging. A packaging house may receive the finished wafers or dice from the manufacturer and test materials and update the integrated circuit design service infrastructure 110 on the status of the packaging and delivery process periodically or asynchronously. In some implementations, status updates may be relayed to the user when the user checks in using the web interface, and/or the controller might email the user that updates are available.

In some implementations, the resulting integrated circuit(s) 132 (e.g., physical chips) are delivered (e.g., via mail) to a silicon testing service provider associated with a silicon testing server 140. In some implementations, the resulting integrated circuit(s) 132 (e.g., physical chips) are installed in a system controlled by the silicon testing server 140 (e.g., a cloud server), making them quickly accessible to be run and tested remotely using network communications to control the operation of the integrated circuit(s) 132. For example, a login to the silicon testing server 140 controlling a manufactured integrated circuit(s) 132 may be sent to the integrated circuit design service infrastructure 110 and relayed to a user (e.g., via a web client). For example, the integrated circuit design service infrastructure 110 may be used to control testing of one or more integrated circuit(s) 132.

Figure 2:
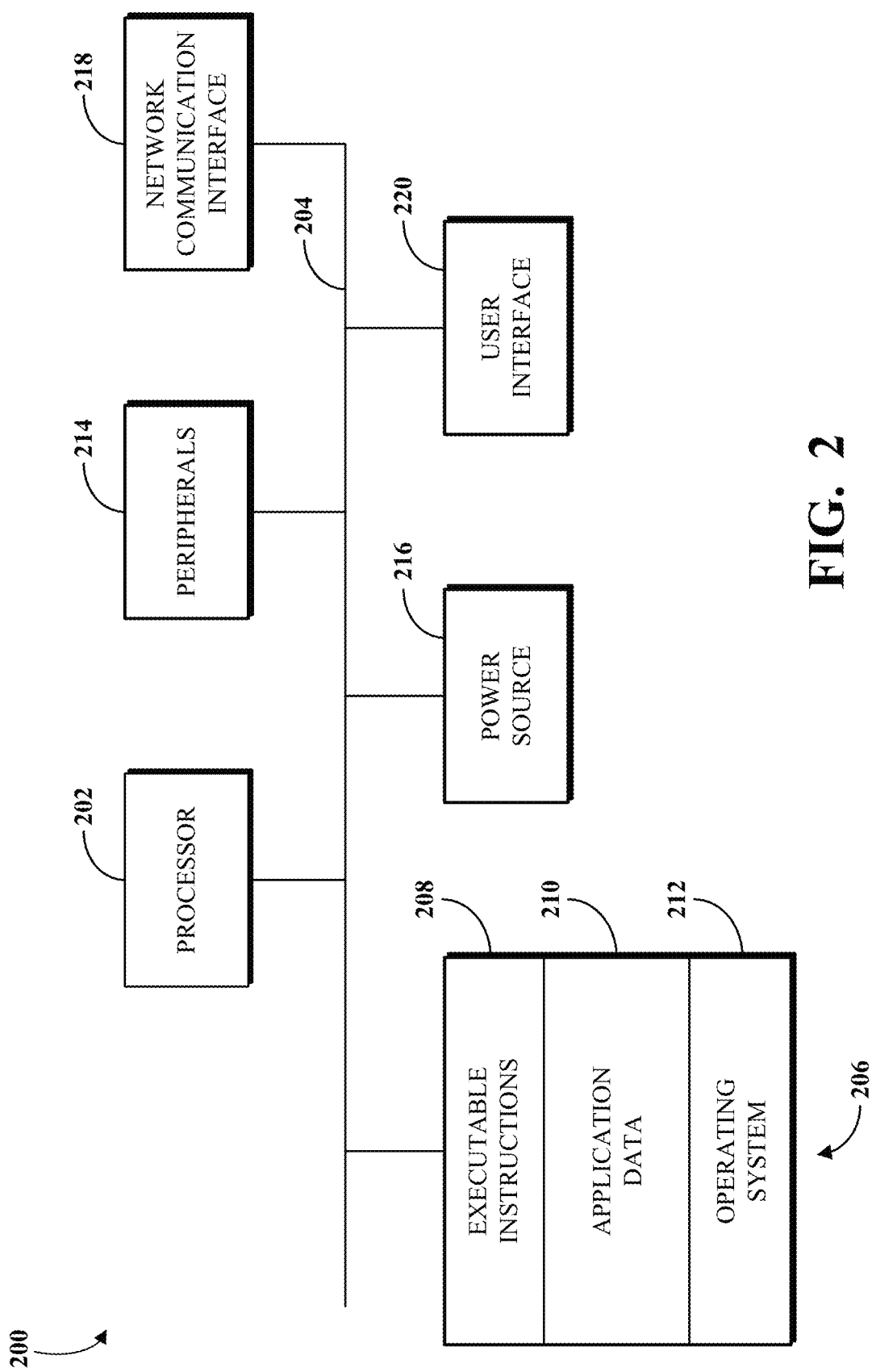
FIG. 2 is a block diagram of an example of a system for facilitating generation of a circuit representation.

FIG. 2 is a block diagram of an example of a system 200 for facilitating generation of integrated circuits, for facilitating generation of a circuit representation for an integrated circuit, and/or for programming or manufacturing an integrated circuit. The system 200 is an example of an internal configuration of a computing device. The system 200 may be used to implement the integrated circuit design service infrastructure 110, and/or to generate a file that generates a circuit representation of an integrated circuit design like the integrated circuit design shown and described in FIG. 3.

The processor 202 can be a central processing unit (CPU), such as a microprocessor, and can include single or multiple processors having single or multiple processing cores. Alternatively, the processor 202 can include another type of device, or multiple devices, now existing or hereafter developed, capable of manipulating or processing information. For example, the processor 202 can include multiple processors interconnected in any manner, including hardwired or networked, including wirelessly networked. In some implementations, the operations of the processor 202 can be distributed across multiple physical devices or units that can be coupled directly or across a local area or other suitable type of network. In some implementations, the processor 202 can include a cache, or cache memory, for local storage of operating data or instructions.

The memory 206 can include volatile memory, non-volatile memory, or a combination thereof. For example, the memory 206 can include volatile memory, such as one or more dynamic random access memory (DRAM) modules such as double data rate (DDR) synchronous DRAM (SDRAM), and non-volatile memory, such as a disk drive, a solid-state drive, flash memory, Phase-Change Memory (PCM), or any form of non-volatile memory capable of persistent electronic information storage, such as in the absence of an active power supply. The memory 206 can include another type of device, or multiple devices, now existing or hereafter developed, capable of storing data or instructions for processing by the processor 202. The processor 202 can access or manipulate data in the memory 206 via the bus 204. Although shown as a single block in FIG. 2, the memory 206 can be implemented as multiple units. For example, a system 200 can include volatile memory, such as random access memory (RAM), and persistent memory, such as a hard drive or other storage.

The memory 206 can include executable instructions 208, data, such as application data 210, an operating system 212, or a combination thereof, for immediate access by the processor 202. The executable instructions 208 can include, for example, one or more application programs, which can be loaded or copied, in whole or in part, from non-volatile memory to volatile memory to be executed by the processor 202. The executable instructions 208 can be organized into programmable modules or algorithms, functional programs, codes, code segments, or combinations thereof to perform various functions described herein. For example, the executable instructions 208 can include instructions executable by the processor 202 to cause the system 200 to automatically, in response to a command, generate an integrated circuit design and associated test results based on a design parameters data structure. The application data 210 can include, for example, user files, database catalogs or dictionaries, configuration information or functional programs, such as a web browser, a web server, a database server, or a combination thereof. The operating system 212 can be, for example, Microsoft Windows®, macOS®, or Linux®; an operating system for a small device, such as a smartphone or tablet device; or an operating system for a large device, such as a mainframe computer. The memory 206 can comprise one or more devices and can utilize one or more types of storage, such as solid-state or magnetic storage.

The peripherals 214 can be coupled to the processor 202 via the bus 204. The peripherals 214 can be sensors or detectors, or devices containing any number of sensors or detectors, which can monitor the system 200 itself or the environment around the system 200. For example, a system 200 can contain a temperature sensor for measuring temperatures of components of the system 200, such as the processor 202. Other sensors or detectors can be used with the system 200, as can be contemplated. In some implementations, the power source 216 can be a battery, and the system 200 can operate independently of an external power distribution system. Any of the components of the system 200, such as the peripherals 214 or the power source 216, can communicate with the processor 202 via the bus 204.

The network communication interface 218 can also be coupled to the processor 202 via the bus 204. In some implementations, the network communication interface 218 can comprise one or more transceivers. The network communication interface 218 can, for example, provide a connection or link to a network, such as the network 106 shown in FIG. 1, via a network interface, which can be a wired network interface, such as Ethernet, or a wireless network interface. For example, the system 200 can communicate with other devices via the network communication interface 218 and the network interface using one or more network protocols, such as Ethernet, transmission control protocol (TCP), Internet protocol (IP), power line communication (PLC), Wi-Fi, infrared, general packet radio service (GPRS), global system for mobile communications (GSM), code division multiple access (CDMA), or other suitable protocols.

A user interface 220 can include a display; a positional input device, such as a mouse, touchpad, touchscreen, or the like; a keyboard; or other suitable human or machine interface devices. The user interface 220 can be coupled to the processor 202 via the bus 204. Other interface devices that permit a user to program or otherwise use the system 200 can be provided in addition to or as an alternative to a display. In some implementations, the user interface 220 can include a display, which can be a liquid crystal display (LCD), a cathode-ray tube (CRT), a light emitting diode (LED) display (e.g., an organic light emitting diode (OLED) display), or other suitable display. In some implementations, a client or server can omit the peripherals 214. The operations of the processor 202 can be distributed across multiple clients or servers, which can be coupled directly or across a local area or other suitable type of network. The memory 206 can be distributed across multiple clients or servers, such as network-based memory or memory in multiple clients or servers performing the operations of clients or servers. Although depicted here as a single bus, the bus 204 can be composed of multiple buses, which can be connected to one another through various bridges, controllers, or adapters.

A non-transitory computer readable medium may store a circuit representation that, when processed by a computer, is used to program or manufacture an integrated circuit. For example, the circuit representation may describe the integrated circuit specified using a computer readable syntax. The computer readable syntax may specify the structure or function of the integrated circuit or a combination thereof. In some implementations, the circuit representation may take the form of a hardware description language (HDL) program, a register-transfer level (RTL) data structure, a flexible intermediate representation for register-transfer level (FIRRTL) data structure, a Graphic Design System II (GDSII) data structure, a netlist, or a combination thereof. In some implementations, the integrated circuit may take the form of a field programmable gate array (FPGA), application specific integrated circuit (ASIC), system-on-a-chip (SoC), or some combination thereof. A computer may process the circuit representation in order to program or manufacture an integrated circuit, which may include programming a field programmable gate array (FPGA) or manufacturing an application specific integrated circuit (ASIC) or a system on a chip (SoC). In some implementations, the circuit representation may comprise a file that, when processed by a computer, may generate a new description of the integrated circuit. For example, the circuit representation could be written in a language such as Chisel, an HDL embedded in Scala, a statically typed general purpose programming language that supports both object-oriented programming and functional programming.

In an example, a circuit representation may be a Chisel language program which may be executed by the computer to produce a circuit representation expressed in a FIRRTL data structure. In some implementations, a design flow of processing steps may be utilized to process the circuit representation into one or more intermediate circuit representations followed by a final circuit representation which is then used to program or manufacture an integrated circuit. In one example, a circuit representation in the form of a Chisel program may be stored on a non-transitory computer readable medium and may be processed by a computer to produce a FIRRTL circuit representation. The FIRRTL circuit representation may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit.

In another example, a circuit representation in the form of Verilog or VHDL may be stored on a non-transitory computer readable medium and may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit. The foregoing steps may be executed by the same computer, different computers, or some combination thereof, depending on the implementation.

Figure 3:
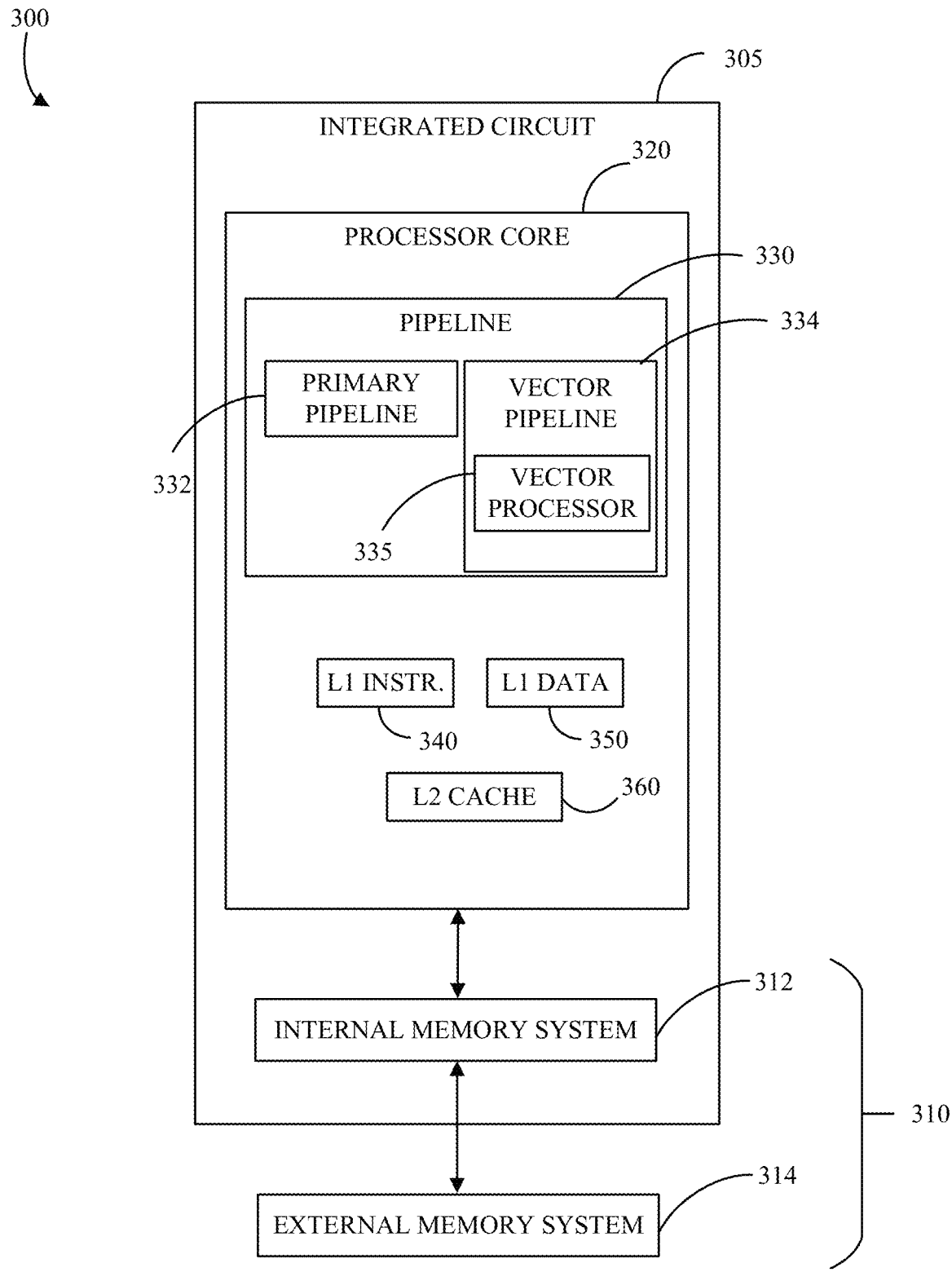
FIG. 3 is a block diagram of an example of an integrated circuit with a primary pipeline and a vector pipeline.

FIG. 3 is a block diagram of an example of a system 300 including an integrated circuit 305 and a memory system 310. The integrated circuit 305 may include a processor core 320. The integrated circuit 305 could be implemented, for example, as a field-programmable gate array (FPGA), an application-specific integrated circuit (ASIC), or a system-on-chip (SoC). The memory system 310 may include an internal memory system 312 and an external memory system 314. The internal memory system 312 may be in communication with the external memory system 314. The internal memory system 312 may be internal to the integrated circuit 305 (e.g., implemented by the FPGA, the ASIC, or the SoC). The external memory system 314 may be external to integrated circuit 305 (e.g., not implemented by the FPGA, the ASIC, or the SoC). The internal memory system 312 may include, for example, a controller and memory, such as random access memory (RAM), static random access memory (SRAM), cache, and/or a cache controller, such as a level three (L3) cache and an L3 cache controller. The external memory system 314 may include, for example, a controller and memory, such as dynamic random access memory (DRAM) and a memory controller. In some implementations, the memory system 310 may include memory mapped inputs and outputs (MMIO), and may be connected to non-volatile memory, such as a disk drive, a solid-state drive, flash memory, and/or phase-change memory (PCM).

The processor core 320 may include circuitry for executing instructions, such as one or more pipelines 330, a level one (L1) instruction cache 340, an L1 data cache 350, and a level two (L2) cache 360 that may be a shared cache. The processor core 320 may fetch and execute instructions in the one or more pipelines 330, for example, as part of a program sequence. The instructions may cause memory requests (e.g., read requests and/or write requests) that the one or more pipelines 330 may transmit to the L1 instruction cache 340, the L1 data cache 350, and/or the L2 cache 360.

Each of the one or more pipelines 330 may include a primary pipeline 332 and a vector pipeline 334. The primary pipeline 332 and the vector pipeline 334 each can have separate decode units, rename units, dispatch units, execution units, physical and/or virtual registers, caches, queues, data paths, and/or other logic associated with instruction flow. The vector pipeline 334 may include one or more vector processor(s) 335.

In some implementations, the primary pipeline 332 and the vector pipeline 334 may be out-of-order pipelines. The system 300 and each component in the system 300 is illustrative and can include additional, fewer, or different components which may be similarly or differently architected without departing from the scope of the specification and claims herein. Moreover, the illustrated components can perform other functions without departing from the scope of the specification and claims herein.

In some implementations, the processor core 320 may further include a vector unit (not shown in Figures), which may be a hardware with set of instructions to perform efficient vector operations. The vector unit may include the pipeline, such as the one or more pipelines 330 including the primary pipeline 332, the vector pipeline 334, the store buffer 336, and the issue queue 338. As the vector unit is designed specifically for vector operations, it may provide high-performance for processing vector data in applications such as machine learning, scientific computing, and data analysis.

As such, inside the processor core 320 and/or the vector unit, there may be pipeline such as the pipeline 330 and/or the vector pipeline 334, and a vector instruction within such pipeline may operate on multiple vector registers. The vector instruction may be split into multiple micro-operations (uops). The uops may be involved in many vector operations including, but not limited to, viota operation, loading vector operands, executing vector addition, vector multiplication, vector store operations, and/or other operations, writing back results, updating status flags (e.g., relevant for the specific vector instruction), error operations, etc.

As initially described, in a basic implementation of viota in an in-order processor, the processor can crack or decode the viota into multiple micro-operations to update multiple destination vector registers. A respective start element viota value of a respective micro-operation depends on the last element in the destination vector register of the previous (e.g., preceding) micro-operation. Accordingly, the viota has a dependency issue. That is, the viota has an ordering dependency between micro-operations, which limits the out-of-order execution and a processor fallbacks to in-order execution. For example, if LMUL=4, the viota will be cracked into 4 micro-operations with a later micro-operation's result depending on the result of previous micro-operation: viota micro-operation 0 calculates the viota value starting from 0; viota micro-operation 1 calculates the viota value starting from the last value (e.g., last element value) of micro-operation 0; viota micro-operation 2 calculates the viota value starting from the last value (e.g., last element value) of micro-operation 1; and viota micro-operation 3 calculates the viota value start from the last value (e.g., last element value) of micro-operation 2. This impacts performance. Such dependency in viota operation is illustrated in FIG. 4.

Figure 4:
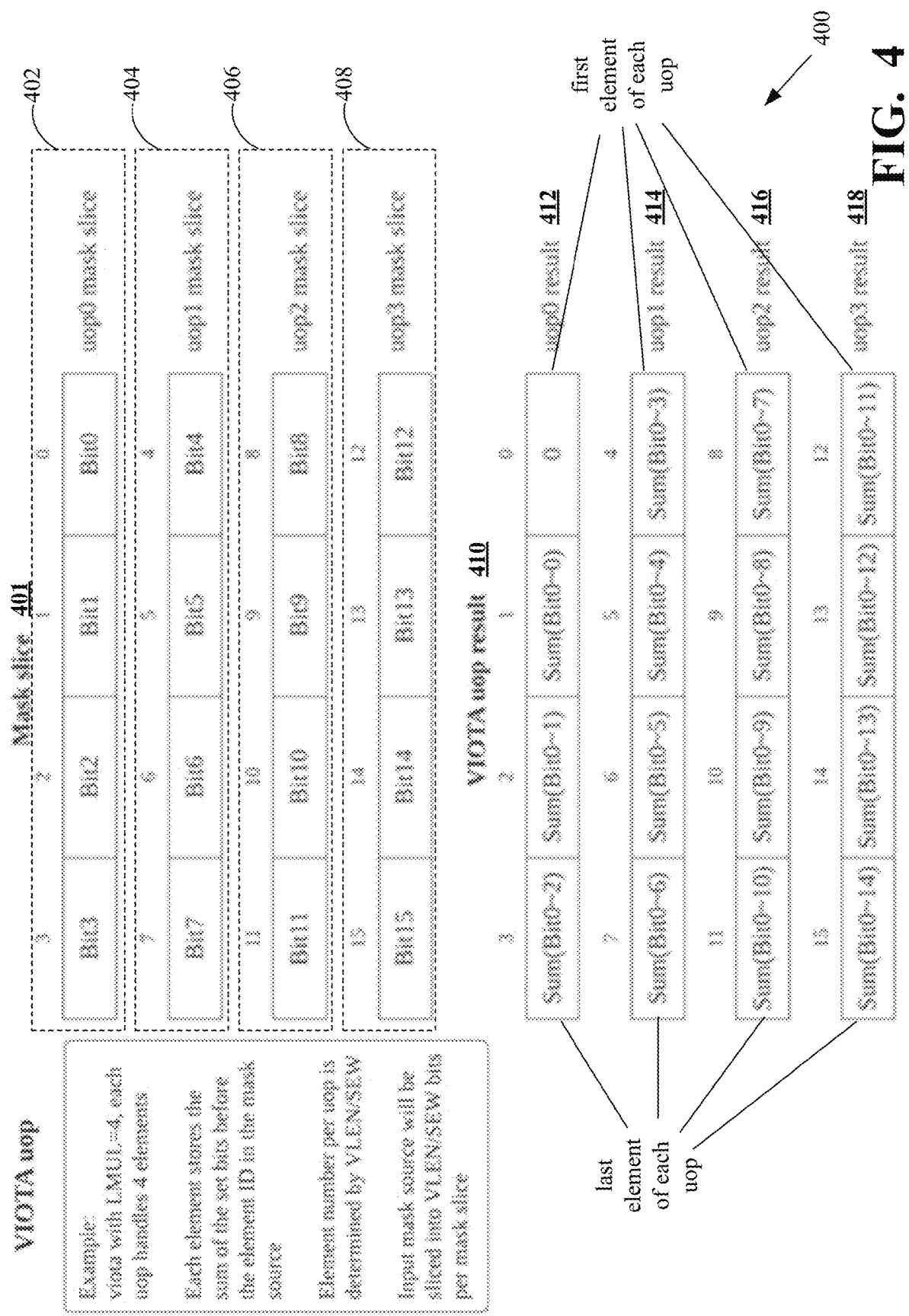
FIG. 4 illustrates an example representation of mask slices of four viota micro-operations (uops) that comprise a viota operation with LMUL=4, and resulting viota values for each element of each respective viota micro-operation (uop) of the four viota uops.

FIG. 4 illustrates an example representation 400 of mask slices of four viota micro-operations (uops) that comprise a viota operation with LMUL=4, and resulting viota values for each element of each respective viota micro-operation (uop) of the four viota uops. FIG. 4 further illustrates dependency of how a respective starting (e.g., first) element viota value of a respective uop depends on the ending (e.g., last) element viota value of the previous (e.g., preceding) viota uop.

Mask slices 401 of four viota micro-operations are shown along with each viota uop (e.g., viota uop 0 402, viota uop 1 404, viota uop 2 406, and viota uop 3 408) having four elements respectively. To illustrate, the viota uop 0 402 has a first element, a second element, a third element, and a fourth element, which correspond to positions of bit number 0 (with Bit0), bit number 1 (with Bit1), bit number 2 (with Bit2), and bit number 3 (with Bit3), respectively. The viota uop 1 404 has a first element, a second element, a third element, and a fourth element, which correspond to positions of bit number 4 (with Bit4), bit number 5 (with Bit5), bit number 6 (with Bit6), and bit number 7 (with Bit7), respectively. Similarly, each of the viota uop 2 and the viota uop 3 have four elements that correspond to respective positions of respective bit numbers as shown in FIG. 4.

Viota uop results 410 are viewed in conjunction with the mask slices 401 and bit numbers. For example, Mask slices 401 comprise uop 0 mask slice, uop 1 mask slice, uop 2 mask slice, uop3 mask slice, which may also correspond to positions of viota uops (e.g., viota uop 0 402, viota uop 1 404, viota uop 2 406, and viota uop 3 408). For example, uop 0 mask slice may comprise four elements with bit number 0 (with Bit0), bit number 1 (with Bit1), bit number 2 (with Bit2), and bit number 3 (with Bit3). For example, uop 1 mask slice may comprise four elements with bit number 4 (with Bit4), bit number 5 (with Bit5), bit number 6 (with Bit6), and bit number 7 (with Bit7). Similarly, each of the uop 2 mask slice and the uop 3 mask slice have four elements that correspond to respective positions of respective bit numbers as shown in FIG. 4. Moreover, sequence (e.g., ordering) of respective elements, viota uops, and mask slices also apply to the boxes under the viota uop results 410.

Viota uop results 410 illustrate respective resulting viota values (e.g., viota uop 0 result 412, viota uop 1 result 414, viota uop 2 result 416, and viota uop 3 result 418) for each viota uop as well as respective elements of each viota uop. The resulting viota value (viota value) for respective element of the viota uop corresponds to a sum of all previous active mask bits. For example, a viota value for the first element of the viota uop 0 402 corresponds to 0. For example, a viota value for the fourth element (or last element) of the viota uop 0 402 corresponds to a sum of active mask bits corresponding to the first, the second, and the third element of the viota uop 0 402. For example, a viota value for the first element of the viota uop 1 404 corresponds to a sum of active mask bits corresponding to the first, the second, the third, and the fourth element of the viota uop 0 402. For example, the first, the second, the third, and the fourth element of the viota uop 0 402 correspond to positions of bit number 0, bit number 1, bit number 2, and bit number 3, respectively. For example, the first, the second, the third, and the fourth element of the viota uop 1 404 correspond to positions of bit number 4, bit number 5, bit number 6, and bit number 7, respectively.

In another example, a viota value for the fourth element (or last element) of the viota uop 1 404 corresponds to a sum of previous active mask bits corresponding to the first, the second, the third, and the fourth element of the viota uop 0 402, and the first, the second, and the third element of the viota uop 1 404.

To state another way, the viota value for the fourth element (or last element) of the viota uop 1 404 corresponds to a sum of the following: 1) viota value for the first element of the viota uop 1 404, and 2) active mask bits of bit number 4, 5, 6 that correspond to the first, the second, and the third element of the viota uop 1 404. This can also be illustrated as either Sum(Bit0~3)+(Bit4+Bit 5+Bit 6) or Sum(Bit0~6). Moreover, following Equation (1) may be used to capture and explain this relationship between a viota value of last element of an $i^{th}$ viota uop and a viota value of first element of the $i^{th}$ viota uop.

$$V_{last_i} = V_{first_i} + \Sigma M_i - M_{last_i} \qquad \text{Equation (1)}$$

In Equation (1), $V_{last_i}$ corresponds to a viota value for a last element of the $i^{th}$ viota uop, $V_{first_i}$ corresponds to a viota value for the first element of the $i^{th}$ viota uop, and $\Sigma M_i$ corresponds to a sum of all active mask bits of mask slice of $i^{th}$ viota uop or sum of all active mask bits that correspond to all elements of the $i^{th}$ viota uop. $M_{last_i}$ corresponds to an active mask bit corresponding to a last element of $i^{th}$ viota uop (e.g., in viota uop 1, $M_{last_i}$ would equal to active mask bit corresponding to a mask bit 7 (e.g., Bit7)).

Moreover, to state another way, since the viota value for the first element corresponds to sum of active mask bits of all previous uops that precede the $i^{th}$ viota uop, which can be denoted as $\Sigma_{j=0}^{i-1}(\Sigma M_j)$, the viota value for the last element of the $i^{th}$ viota uop can also be expressed as:

$$V_{last_i} = \Sigma_{j=0}^{i-1}(\Sigma M_j) + \Sigma M_i - M_{last_i}; V_{first_i} = \Sigma_{j=0}^{i-1}(\Sigma M_j) \qquad \text{Equation (2)}$$

In Equation (2), $V_{last_i}$ corresponds to a viota value for a last element of an $i^{th}$ viota uop, $\Sigma_{j=0}^{i-1}(\Sigma M_j)$ corresponds to sum of active mask bits of all previous uops that precede the $i^{th}$ viota uop, $\Sigma M_i$ corresponds to a sum of active mask bits that correspond to elements of the $i^{th}$ viota uop, and $M_{last_i}$ corresponds to active mask bit corresponding to a last element of $i^{th}$ viota uop. As described above, $\Sigma_{j=0}^{i-1}(\Sigma M_j)$ also corresponds to $V_{first_i}$, which is the viota value for the first element of the $i^{th}$ viota uop.

Moreover, a viota value for respective element (for illustration purposes, we will denote it as "current" element) of the $i^{th}$ viota uop can be expressed as:

$$V_{current_i} = V_{first_i} + \Sigma M_{up\ to\ current_i} - M_{current_i}; V_{first_i} = \Sigma_{j=0}^{i-1}(\Sigma M_j) \qquad \text{Equation (3)}$$

In Equation (3), $V_{current_i}$ corresponds to a viota value for the respective element (the current element) of the $i^{th}$ viota uop, $\Sigma M_{up\ to\ current_i}$ corresponds to a sum of active mask bits (of $i^{th}$ viota uop) up to the current element, and $M_{current_i}$ corresponds to active mask bit of the current element of the $i^{th}$ viota uop.

Accordingly, by utilizing one or more relationships between $V_{last_i}$, $V_{first_i}$, $\Sigma M_i$, and/or $\Sigma_{j=0}^{i-1}(\Sigma M_j)$, a respective viota value of a respective element (e.g., first element viota value, last element viota value) of a respective viota uop can be determined or computed without relying on or waiting for a resulting viota value of a last element of a previous (e.g., preceding) viota uop to be computed or determined. That is, the viota uops may be executed in out-of-order and processor fallbacks to in-order execution may be resolved. For example, calculating one element at a time by hardware selecting one bit from the mask source at a time and adding it to the current result element, or other ways that determine current viota value by waiting for one or more previous values to be computed, may cause efficiency issues such as speed of performing the operation and needs for hardware to hold previous results. As such, computing or determining the respective viota value of the respective element (e.g., first element viota value, last element viota value) without relying on or waiting for a resulting viota value of a last element of a previous (e.g., preceding) viota uop may resolve such issues.

A desirable system and technique for executing viota operation may be implemented by always (or continuously) re-computing the "first element viota value" for each micro-operation such that the viota micro-operations are no longer dependent on a previous result.

Figure 5:
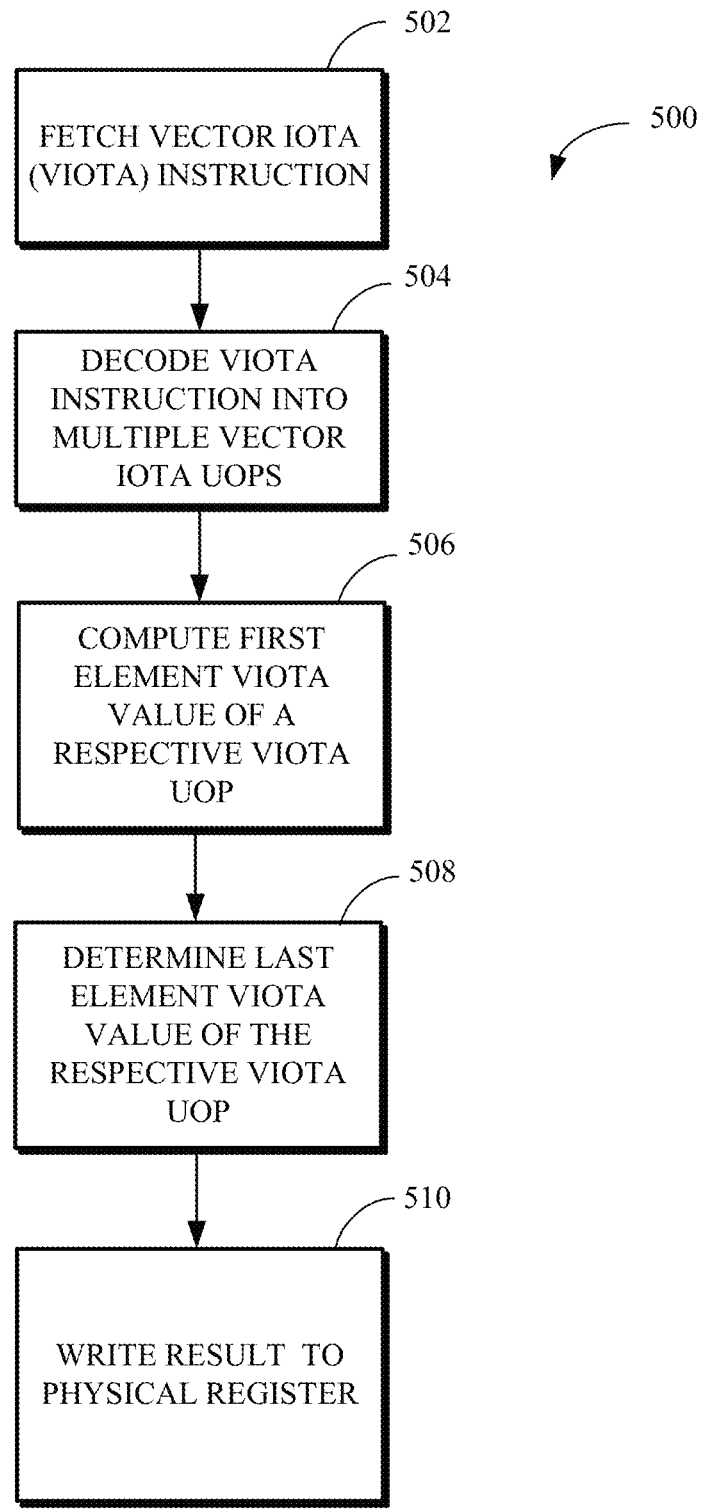
FIG. 5 is a flow chart of a method for executing vector iota (viota) instruction and/or operation in accordance with implementations of this disclosure.

FIG. 5 is a flow chart of a method 500 for executing viota instruction and/or operation using a technique for computing a first element viota value for each micro-operation corresponding to the viota instruction in accordance with implementations of this disclosure. The method 500 can be implemented, for example, by a processor, such as the processor 202, the processor core 320, and/or the vector processor 335, and a pipeline such as the pipeline 330, the vector pipeline 334, and the pipeline in the vector unit as described above. The term "micro-operation" may be used interchangeably with a term "uop."

At 502, the method 500 may fetch a viota instruction. The viota instruction may include executable instructions for a viota operation. The viota operation can read a source vector mask register and write to each element of a destination vector register group a sum of bits of elements in a mask register, the mask register having an index that is less than the element (e.g., a parallel prefix sum of mask values).

At 504, the method 500 may decode the viota instruction into multiple viota uops. For example, the viota Each viota instruction may be decoded into multiple viota uops based on a size of LMUL, where LMUL is a vector group size. For example, the processor or the vector processor may crack or decode the viota instruction into multiple viota uops to update multiple destination vector registers. For example, the number of viota uops may correspond to LMUL.

Each viota uop of the multiple viota uops may represent a portion of the viota operation, and may have multiple elements. Each element may have a viota value corresponding to a sum of all previous active mask bits.

Moreover, starting element of a respective uop may include and/or correspond to a position of a starting bit position of a respective uop, and a last element of the respective uop may include and/or correspond to a position of a last bit position of the respective uop, as described above with respect to the example representation 400 of the FIG. 4.

In some implementations, the viota instruction may be decoded into multiple out-of-order viota uops. In some implementations, the viota instruction may be decoded into multiple in-order viota uops.

At 506, the method 500 may compute (e.g., continuously compute, always re-compute) a first element viota value (e.g., viota value for the first element) of a respective viota uop. For example, a first element viota value may be computed respectively for one or more viota uops. For example, a first element viota value may be computed respectively for all viota uops.

In some implementations, the first element viota value of the respective viota uop may be computed without waiting for a result of a last element viota value (e.g., viota value for the last element) of a preceding viota uop that precedes the respective viota uop. In some implementations, the first element viota value of the respective viota uop may be computed without relying on a computed value of a last element viota value of a preceding viota uop that precedes the respective viota uop.

For example, computing the first element viota value of the respective viota uop can include determining the first element viota value of the respective viota uop based on summing of active mask bits of all preceding mask slices or all preceding viota uops which precede the respective viota uop. For example, the first element viota value of the respective viota uop can be expressed as $V_{first_i} = \Sigma_{j=0}^{i-1}(\Sigma M_j)$, as described above in the Equation (2).

At 508, the method 500 may determine a respective last element viota value of the respective viota uop. For example, the respective last element viota value of the respective viota uop may be determined based on the first element viota value of the respective uop. For example, computed or determined first element viota value of the respective viota uop can be added to a sum of active mask bits of the respective viota uop, where the active mask bits correspond to all elements of the respective viota uop that exclude or precede the last element of the respective viota uop. Here, "all elements" of the respective viota uop that exclude or precede the last element of the respective viota uop do not include the last element of the respective viota uop and also elements of previous uops. For example, the respective last element viota value of the respective uop can be expressed as described above in the Equation (1).

In some implementations, a viota value for the respective element of the $i^{th}$ viota uop may be determined using a relationship depicted in Equation (3) or using the Equation (3). For example, a second element viota value of the $2^{nd}$ viota uop may be determined based on first determining a first element viota value of the $2^{nd}$ viota uop and adding an active mask bit corresponding to the first element of the $2^{nd}$ viota uop.

At 510, the method 500 may write result of the respective viota uop to allocated physical registers. For example, result of the respective viota uop may be the respective last element viota value of the respective viota uop determined at step 508.

In some implementations, if the viota value for the respective element of the $i^{th}$ viota uop was determined at step 508 using a relationship depicted in Equation (3), the method 500 may write result of viota value for the respective element of the $i^{th}$ viota uop.

Moreover, after writing the respective result of the respective viota uop to respective allocated physical register, the method 500 may retire (e.g., freed) the respective viota uop.

Figure 6:
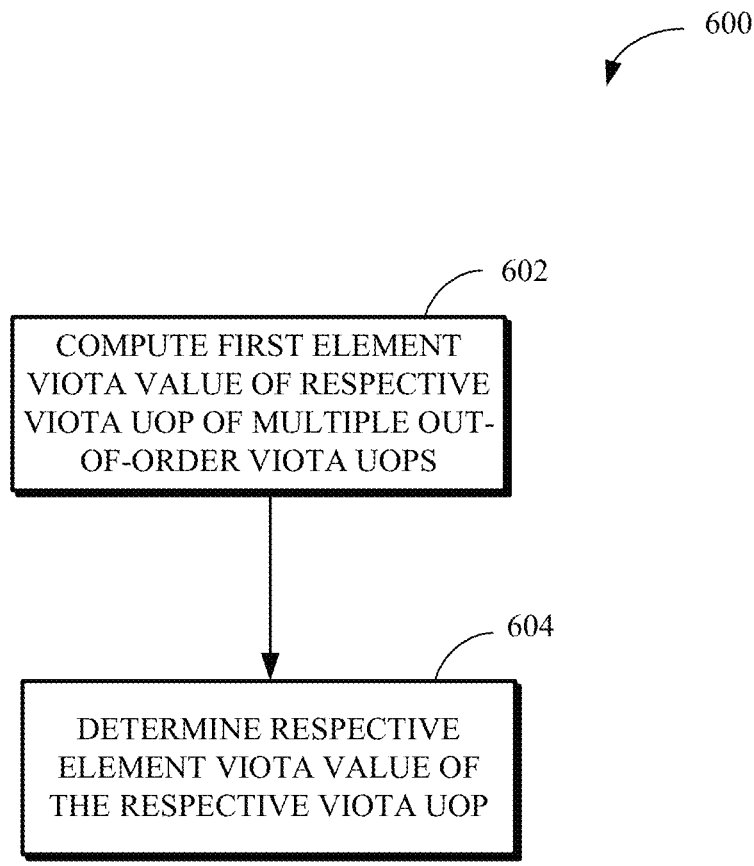
FIG. 6 is a flow chart of a method for determining a viota value for a respective element of a respective viota uop in accordance with implementations of this disclosure.

FIG. 6 is a flow chart of a method 600 for determining a viota value for a respective element of a respective viota uop in accordance with implementations of this disclosure. The method 600 can be implemented, for example, by a processor, such as the processor 202, the processor core 320, and/or the vector processor 335, and a pipeline such as the pipeline 330, the vector pipeline 334, and the pipeline in the vector unit as described above. Moreover, the method 600 may be combined with method 500 in any feasible manner in accordance with implementations of this disclosure.

At 602, the method 600 may compute (e.g., continuously compute, always re-compute) a first element viota value of a respective viota uop. For example, a first element viota value may be computed respectively for one or more viota uops. For example, a first element viota value may be computed respectively for all viota uops.

In some implementations, the first element viota value of the respective viota uop may be computed without waiting for a result of a last element viota value of a preceding viota uop that precedes the respective viota uop. In some implementations, the first element viota value of the respective viota uop may be computed without relying on a computed value of a last element viota value of a preceding viota uop that precedes the respective viota uop.

For example, computing the first element viota value of the respective viota uop can include determining the first element viota value of the respective viota uop based on summing of active mask bits of all preceding viota uops which precede the respective viota uop. For example, the first element viota value of the respective viota uop can be expressed as $V_{first_i} = \Sigma_{j=0}^{i-1}(\Sigma M_j)$, as described above in the Equation (2).

At 604, the method 600 may determine a viota value for the respective element of the respective viota uop. For example, the viota value for the respective element of the respective uop (e.g., $i^{th}$ viota uop) may be determined using a relationship depicted in Equation (3) or using the Equation (3). For example, a second element viota value of the $2^{nd}$ viota uop may be determined based on first determining a first element viota value of the $2^{nd}$ viota uop and adding an active mask bit corresponding to the first element of the $2^{nd}$ viota uop.

After the viota value for the respective element of the respective viota uop is determined, it may be written to one or more allocated physical registers.

The described methods and systems include a method for executing vector iota (viota) operation. The method includes decoding a fetched viota instruction into viota micro-operations (uops); computing a first element viota value of a respective viota uop; determining a respective last element viota value of the respective viota uop based on the first element viota value of the respective uop; and writing the respective last element viota value of the respective viota uop to an allocated physical register. Each viota uop of the viota uops can have multiple elements, where each element can have a viota value corresponding to a sum of active mask bits of preceding elements of the viota uops. The multiple elements of each viota uop include at least a first element that has a starting bit position of a respective uop and a last element that has an ending bit position of the respective uop.

In implementations, the viota instruction can be decoded into viota uops in out-of-order.

In implementations, computing the first element viota value of the respective viota uop can be performed without waiting for a result of a last element viota value of a preceding viota uop that precedes the respective viota uop.

In implementations, computing the first element viota value of the respective viota uop can be performed without relying on a computed value of a last element viota value of a preceding viota uop that precedes the respective viota uop.

In implementations, computing the first element viota value of the respective viota uop can include determining the first element viota value of the respective viota uop based on summing of active mask bits of all preceding viota uops which precede the respective viota uop. In implementations, determining the respective last element viota value of the respective viota uop based on the first element viota value of the respective uop can include adding the first element viota value of the respective viota uop to a sum of active mask bits that correspond to all elements of the respective viota uop that exclude or precede the last element of the respective viota uop. In implementations, after writing the respective last element viota value of the respective viota uop to an allocated physical register, viota uop can be retired or freed.

The described methods and systems include a non-transitory computer readable medium that includes a circuit representation. The circuit representation, when processed by a computer, can be used to program or manufacture an integrated circuit that includes a processor. Such processor can include a circuitry configured to fetch a vector iota (viota) instruction; decode a fetched viota instruction into viota micro-operations (uops); compute a first element viota value of the respective viota uop; determine a respective last element viota value of the respective viota uop based on the first element viota value of the respective uop; and write the respective last element viota value of the respective viota uop to an allocated physical register. The viota instruction can include executable instructions for a viota operation that reads a source vector mask register and writes to each element of a destination vector register group a sum of bits of elements in a mask register. Each viota uop of the viota uops can have multiple elements, where each element can have a viota value corresponding to a sum of active mask bits of preceding elements of the viota uops. The multiple elements of each viota uop can include at least a first element that has a starting bit position of a respective uop and a last element that has an ending bit position of the respective uop.

In implementations, the viota instruction can be decoded into the viota uops in out-of-order.

In implementations, wherein to compute the first element viota value of the respective viota uop can be performed without waiting for a result of a last element viota value of a preceding viota uop that precedes the respective viota uop.

In implementations, to compute the first value of the respective viota uop can be performed without relying on a computed value of a last element viota value of a preceding viota uop that precedes the respective viota uop.

In implementations, to compute the first element viota value of the respective viota uop can include to determine the first element viota value of the respective viota uop based on summing of active mask bits of all preceding viota uops which precede the respective viota uop. In implementations, to determine the respective last element viota value of the respective viota uop based on the first element viota value of the respective uop can include to add the first element viota value of the respective viota uop to a sum of active mask bits that correspond to all elements of the respective viota uop that exclude or precede the last element of the respective viota uop. In implementations, the processor can be further configured to: after writing the respective last element viota value of the respective viota uop to an allocated physical register, retire the viota uop.

The described methods and systems include an integrated circuit. The integrated circuit can include a vector pipeline and a vector processor. The vector processor can be configured to decode a fetched viota instruction into out-of-order viota micro-operations (uops); compute a first element viota value of the respective viota uop; and determine a respective last element viota value of the respective viota uop based on the first element viota value of the respective uop. Each viota uop of the viota uops can have multiple elements, where each element can have a viota value corresponding to a sum of active mask bits of preceding elements of the viota uops. The multiple elements of each viota uop can include at least a first element that has a starting bit position of a respective uop and a last element that has an ending bit position of the respective uop.

In implementations, to compute the first element viota value of the respective viota uop can be performed without waiting for a result of a last element viota value of a preceding viota uop that precedes the respective viota uop.

In implementations, to compute the first element viota value of the respective viota uop can be performed without relying on a computed value of a last element viota value of a preceding viota uop that precedes the respective viota uop.

In implementations, to compute the first value of the respective viota uop can include to determine the first element viota value of the respective viota uop based on summing of active mask bits of all preceding viota uops which precede the respective viota uop. In implementations, to determine the respective last element viota value of the respective viota uop based on the first element viota value of the respective uop can include to: add the first element viota value of the respective viota uop to a sum of active mask bits of mask slices that correspond to all elements of the respective viota uop that exclude or precede the last element of the respective viota uop. In implementations, the vector processor can be further configured to write the respective last element viota value of the respective viota uop to an allocated physical register.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures.

What is claimed is:

1. A method for executing vector iota (viota) operation, the method comprising:
   decoding a fetched viota instruction into viota micro-operations (uops), wherein:
      each viota uop of the viota uops has multiple elements, each element having a viota value corresponding to a sum of active mask bits of preceding elements of the viota uops; and
      the multiple elements of each viota uop comprise at least a first element that has a starting bit position of a respective uop and a last element that has an ending bit position of the respective uop;
   computing a first element viota value of a respective viota uop;
   determining a respective last element viota value of the respective viota uop based on the first element viota value of the respective uop; and
   writing the respective last element viota value of the respective viota uop to an allocated physical register.

2. The method of claim 1, wherein the viota instruction is decoded into viota uops in out-of-order.

3. The method of claim 1, wherein computing the first element viota value of the respective viota uop is performed without waiting for a result of a last element viota value of a preceding viota uop that precedes the respective viota uop.

4. The method of claim 1, wherein computing the first element viota value of the respective viota uop is performed without relying on a computed value of a last element viota value of a preceding viota uop that precedes the respective viota uop.

5. The method of claim 1, wherein computing the first element viota value of the respective viota uop includes:
   determining the first element viota value of the respective viota uop based on summing of active mask bits of all preceding viota uops which precede the respective viota uop.

6. The method of claim 5, wherein determining the respective last element viota value of the respective viota uop based on the first element viota value of the respective uop comprises:
   adding the first element viota value of the respective viota uop to a sum of active mask bits that correspond to all elements of the respective viota uop that exclude or precede the last element of the respective viota uop.

7. The method of claim 6, further comprising:
   after writing the respective last element viota value of the respective viota uop to an allocated physical register, retiring the viota uop.

8. A non-transitory computer readable medium comprising a circuit representation that, when processed by a computer, is used to program or manufacture an integrated circuit comprising:
   a processor including circuitry configured to:
   fetch a vector iota (viota) instruction, wherein the viota instruction includes executable instructions for a viota operation that reads a source vector mask register and writes to each element of a destination vector register group a sum of bits of elements in a mask register;
   decode a fetched viota instruction into viota micro-operations (uops), wherein:
      each viota uop of the viota uops has multiple elements, each element having a viota value corresponding to a sum of active mask bits of preceding elements of the viota uops; and
      the multiple elements of each viota uop comprise at least a first element that has a starting bit position of a respective uop and a last element that has an ending bit position of the respective uop;
   compute a first element viota value of the respective viota uop;
   determine a respective last element viota value of the respective viota uop based on the first element viota value of the respective uop; and
   write the respective last element viota value of the respective viota uop to an allocated physical register.

9. The non-transitory computer readable medium of claim 8, wherein the viota instruction is decoded into the viota uops in out-of-order.

10. The non-transitory computer readable medium of claim 8, wherein to compute the first element viota value of the respective viota uop is to be performed without waiting for a result of a last element viota value of a preceding viota uop that precedes the respective viota uop.

11. The non-transitory computer readable medium of claim 8, wherein to compute the first value of the respective viota uop is to be performed without relying on a computed value of a last element viota value of a preceding viota uop that precedes the respective viota uop.

12. The non-transitory computer readable medium of claim 8, wherein to compute the first element viota value of the respective viota uop comprises to:
   determine the first element viota value of the respective viota uop based on summing of active mask bits of all preceding viota uops which precede the respective viota uop.

13. The non-transitory computer readable medium of claim 12, wherein to determine the respective last element viota value of the respective viota uop based on the first element viota value of the respective uop comprises to:
   add the first element viota value of the respective viota uop to a sum of active mask bits that correspond to all elements of the respective viota uop that exclude or precede the last element of the respective viota uop.

14. The non-transitory computer readable medium of claim 13, wherein the processor is further configured to:
   after writing the respective last element viota value of the respective viota uop to an allocated physical register, retire the viota uop.

15. An integrated circuit comprising:
   a vector pipeline; and
   a vector processor configured to:
   decode a fetched viota instruction into out-of-order viota micro-operations (uops), wherein:
      each viota uop of the viota uops has multiple elements, each element having a viota value corresponding to a sum of active mask bits of preceding elements of the viota uops; and
      the multiple elements of each viota uop comprise at least a first element that has a starting bit position of a respective uop and a last element that has an ending bit position of the respective uop;
   compute a first element viota value of the respective viota uop; and
   determine a respective last element viota value of the respective viota uop based on the first element viota value of the respective uop.

16. The integrated circuit of claim 15, wherein to compute the first element viota value of the respective viota uop is to be performed without waiting for a result of a last element viota value of a preceding viota uop that precedes the respective viota uop.

17. The integrated circuit of claim 15, wherein to compute the first value of the respective viota uop is to be performed without relying on a computed value of a last element viota value of a preceding viota uop that precedes the respective viota uop.

18. The integrated circuit of claim 15, wherein to compute the first value of the respective viota uop comprises to:
   determine the first element viota value of the respective viota uop based on summing of active mask bits of all preceding viota uops which precede the respective viota uop.

19. The integrated circuit of claim 18, wherein to determine the respective last element viota value of the respective viota uop based on the first element viota value of the respective uop comprises to:
   add the first element viota value of the respective viota uop to a sum of active mask bits of mask slices that correspond to all elements of the respective viota uop that exclude or precede the last element of the respective viota uop.

20. The integrated circuit of claim 19, wherein the vector processor is further configured to:
   write the respective last element viota value of the respective viota uop to an allocated physical register.

\* \* \* \* \*